(12) United States Patent
Barrett-Gonzales

(10) Patent No.: US 9,004,393 B2
(45) Date of Patent: Apr. 14, 2015

(54) SUPERSONIC HOVERING AIR VEHICLE

(75) Inventor: Ronald M. Barrett-Gonzales, Lawrence, KS (US)

(73) Assignee: University of Kansas, Lawrence, KS (US)

( * ) Notice: Subject to any disclaimer, the term of this patent is extended or adjusted under 35 U.S.C. 154(b) by 93 days.

(21) Appl. No.: 13/279,827

(22) Filed: Oct. 24, 2011

(65) Prior Publication Data

US 2012/0097801 A1    Apr. 26, 2012

Related U.S. Application Data

(60) Provisional application No. 61/406,140, filed on Oct. 24, 2010.

(51) Int. Cl.
| B64C 27/24 | (2006.01) |
|---|---|
| B64C 29/02 | (2006.01) |
| B64C 39/02 | (2006.01) |

(52) U.S. Cl.
CPC ............... *B64C 29/02* (2013.01); *B64C 27/24* (2013.01); *B64C 39/024* (2013.01); *B64C 2201/027* (2013.01); *B64C 2201/084* (2013.01); *B64C 2201/102* (2013.01)

(58) Field of Classification Search
USPC ............ 244/7 A, 3.27, 3.28, 14, 17.23, 17.11
See application file for complete search history.

(56) References Cited

U.S. PATENT DOCUMENTS

| | | |
|---|---|---|
| 2,037,745 A | 4/1936 | Vaughn |
| 2,417,896 A | 3/1947 | Zimmerman |
| 2,997,258 A | 8/1961 | Purpura |
| 3,023,980 A | 3/1962 | Martin et al. |
| 3,142,455 A * | 7/1964 | Wilford .................. 244/7 B |
| 3,356,315 A | 12/1967 | Kolodziej |
| 3,393,882 A | 7/1968 | Soulez-Lariviere et al. |
| 3,768,757 A | 10/1973 | Eickmann |
| 3,972,490 A | 8/1976 | Zimmermann et al. |
| 4,071,206 A | 1/1978 | Magill |
| 4,478,379 A | 10/1984 | Kerr |
| 4,982,914 A | 1/1991 | Eickmann |
| 5,086,993 A | 2/1992 | Wainfan |
| 5,145,129 A | 9/1992 | Gebhard |
| 5,150,857 A | 9/1992 | Moffitt et al. |
| 5,152,478 A | 10/1992 | Cycon et al. |
| 5,170,963 A | 12/1992 | Beck |
| 5,226,350 A | 7/1993 | Cycon et al. |
| 5,277,380 A | 1/1994 | Cycon et al. |
| 5,295,643 A | 3/1994 | Ebbert et al. |

(Continued)

*Primary Examiner* — Tien Dinh
*Assistant Examiner* — Vicente Rodriguez
(74) *Attorney, Agent, or Firm* — Douglas G. Gallagher; John V. Daniluck; Bingham Greenebaum Doll LLP

(57) ABSTRACT

Embodiments of the present invention include an aircraft capable of sustained out-of-ground-effect hover flight and sustained supersonic flight. At least some embodiments includes two wings powered by an engine to counterrotate while hovering, and to not rotate and sweep while flying at transonic and supersonic speeds. Other embodiments include two rotating wings that generate a force per unit area of under 100 lb/ft2 within the rotating wing disk during hover. Still other embodiment include a vehicle with rotating wings that can increase pitch to accelerate the aircraft, align the chord line of the wings with the airstream, and sweep the wings. Still further embodiments include a power plant that powers unducted rotating wings during hover and disengages from the wings to propel the aircraft at supersonic speeds.

14 Claims, 9 Drawing Sheets

(56) References Cited

U.S. PATENT DOCUMENTS

| | | | |
|---|---|---|---|
| 5,297,759 | A | 3/1994 | Tilbor et al. |
| 5,351,913 | A | 10/1994 | Cycon et al. |
| 5,372,337 | A | 12/1994 | Kress et al. |
| 5,407,150 | A | 4/1995 | Sadleir |
| 5,419,513 | A | 5/1995 | Flemming et al. |
| 5,575,438 | A | 11/1996 | McGonigle et al. |
| 5,695,153 | A | 12/1997 | Britton et al. |
| 5,779,188 | A | 7/1998 | Frick |
| 5,863,013 | A | 1/1999 | Schmittle |
| 5,890,441 | A | 4/1999 | Swinson et al. |
| 5,941,478 | A | 8/1999 | Schmittle |
| 6,065,718 | A | 5/2000 | Piasecki |
| 6,073,882 | A | 6/2000 | Zieger |
| 6,142,421 | A * | 11/2000 | Palmer ................. 244/135 B |
| 6,170,778 | B1 | 1/2001 | Cycon et al. |
| 6,270,038 | B1 | 8/2001 | Cycon et al. |
| 6,422,508 | B1 | 7/2002 | Barnes |
| 6,450,445 | B1 | 9/2002 | Moller |
| 6,488,232 | B2 | 12/2002 | Moshier |
| 6,502,787 | B1 | 1/2003 | Barrett |
| 6,575,402 | B1 | 6/2003 | Scott |
| 6,588,701 | B2 | 7/2003 | Yavnai |
| 6,604,706 | B1 | 8/2003 | Bostan |
| 6,622,090 | B2 | 9/2003 | Lin |
| 6,665,594 | B1 | 12/2003 | Armstrong |
| 6,669,137 | B1 * | 12/2003 | Chen ..................... 244/7 R |
| 6,691,949 | B2 | 2/2004 | Plump |
| 6,694,228 | B2 | 2/2004 | Rios |
| 6,712,312 | B1 | 3/2004 | Kucik |
| 6,721,646 | B2 | 4/2004 | Carroll |
| 6,847,865 | B2 | 1/2005 | Carroll |
| 6,873,886 | B1 | 3/2005 | Mullen et al. |
| 6,883,748 | B2 | 4/2005 | Yoeli |
| 7,032,861 | B2 | 4/2006 | Sanders, Jr. et al. |
| 7,044,422 | B2 | 5/2006 | Bostan |
| 7,158,877 | B2 | 1/2007 | Carlsson |
| 7,231,294 | B2 | 6/2007 | Bodin et al. |
| 7,249,732 | B2 | 7/2007 | Sanders, Jr. et al. |
| 7,289,906 | B2 | 10/2007 | van der Merwe et al. |
| 7,299,130 | B2 | 11/2007 | Mulligan et al. |
| 7,302,316 | B2 | 11/2007 | Beard et al. |
| 7,658,346 | B2 | 2/2010 | Goossen |
| 7,681,832 | B2 | 3/2010 | Colclough |
| 2002/0003188 | A1 | 1/2002 | Moshier |
| 2002/0113165 | A1 | 8/2002 | Moshier |
| 2004/0094662 | A1 | 5/2004 | Sanders et al. |
| 2005/0082421 | A1 | 4/2005 | Perlo et al. |
| 2006/0049304 | A1 | 3/2006 | Sanders et al. |
| 2006/0231675 | A1 | 10/2006 | Bostan |
| 2007/0018052 | A1 | 1/2007 | Eriksson |
| 2007/0034738 | A1 | 2/2007 | Sanders et al. |
| 2007/0051848 | A1 | 3/2007 | Mantych et al. |
| 2007/0069083 | A1 | 3/2007 | Shams et al. |
| 2007/0129855 | A1 | 6/2007 | Coulmeau |
| 2007/0200027 | A1 | 8/2007 | Johnson |
| 2007/0244608 | A1 | 10/2007 | Rath et al. |
| 2007/0262195 | A1 | 11/2007 | Bulaga |
| 2011/0006166 | A1 * | 1/2011 | Arlton et al. ................. 244/7 A |

* cited by examiner

SUPERSONIC HOVERING AIR VEHICLE

This application claims the benefit of U.S. Provisional Patent Application No. 61/406,140, filed Oct. 24, 2010, the entirety of which is hereby incorporated herein by reference.

FIELD

Various embodiments of the present invention relate to a new class of aircraft being developed for highly disparate mission points, spanning hover through supersonic flight. More specifically, various embodiments relate to aircraft which use counter-rotating unducted rotors to sustain the aircraft in hovering flight, then gaining altitude and airspeed, pitching over and flying at ever faster speeds with completely stopped and folded rotors through supersonic, jet (or rocket) mode flight. The aircraft is also capable of any number of transitions in and out of the various flight modes.

BACKGROUND

There are many forms of hovering aircraft that have been conceived over the past 130 years, starting with Alphonse Penaud's planophore and moving forward. Nearly all of these aircraft have taken the form of what we have come to know as "conventional" helicopters, that is, an aircraft with one or more main rotors and possibly a tail rotor. The fundamental problem with all of these conventional helicopters is that once they start to move forward in horizontal flight, the mostly horizontal rotor experiences extreme aerodynamic difficulties. Chief among those are adverse transonic effects on drag on the advancing blades and unsteady stall on the retreating side.

Several attempts have been made to skirt these high speed effects with limited success through the years. These include pitching the rotors over so that oncoming air is ingested primarily by rotors which are oriented normal to oncoming flow. The XV-15 and V-22 both use this general scheme for achieving higher speed flight, but are also hamstrung in high speed flight as transonic rotor effects eventually creep in and retard forward flight performance in the mid-subsonic range.

Another approach to achieving hovering flight and high speed dash speeds was seen in the various body pitch aircraft. Several early aircraft which "converted" from hovering to airplane mode flight included the Convair XFY-1 and the Lockheed XFV-1. These aircraft used counterrotating propellers located at the front of the aircraft to achieve vertical take-off and landing while an empennage assembly provided nearly all flight control on takeoff and landing. Because of extremely high disk loading and very low control authority, this scheme was shown to be difficult to manage at best. Accordingly, it was abandoned nearly 40 years ago.

Modern convertible aircraft include have taken advantage of aerodynamic effects associated with ring-wing flight. The successful XQ-138 described in U.S. Pat. No. 6,502,787 Convertible vertical take-off and landing miniature aerial vehicle employed a ducted fan for vertical take-off, landing and hovering mode flight. This aircraft enjoyed extended hover times coupled with comparatively high speed dash speeds, again, only through the mid-subsonic flight regimes because of transonic effects.

Several other ducted fan aircraft have been robustly researched recently including those described in U.S. Pat. No. 5,295,643, Unmanned Vertical Take-off and Landing, Horizontal Cruise, Air Vehicle, U.S. Pat. No. 6,691,949 Vertical Take-Off and Landing Aerial Vehicle, U.S. Pat. No. 7,032,861, Quiet Vertical Takeoff and Landing Aircraft, U.S. Pat. No. 7,681,832 Ducted Fan Air Vehicle with Deployable Wings and U.S. Pat. No. 7,658,346 Double Ducted Hovering Air Vehicle, US Pat. Application 20060049304, Quiet Vertical Takeoff and Landing Aircraft Using Ducted, Magnetic Induction Air-Impeller Rotors. These and many others employ a ducted fan configuration which can help increase rotor efficiency and offers extra volume for mission packages and fuel storage, but it comes at a high price. That price is seen most vividly as higher airspeeds are sought.

Because a ducted fan assembly typically possesses an extremely high wetted area with respect to the clean fuselage/rotor combination, its profile and parasite drag components become high as flight speeds are increased. Indeed, the drag components are so profound that no ducted fan aircraft capable of sustained hovering flight has ever been able to sustain flight beyond mid-subsonic flight speeds.

There are a host of other aircraft concepts which are related to hovering aircraft and uninhabited aerial vehicles (UAVs), but are in support of these older, aforementioned concepts. Specifically, many of these designs are fundamentally not compatible with aircraft that are capable of sustained supersonic flight: US Pat. Application no. 20070262195, UAV With Control and Stability System, US Pat. Application no. 20070244608, Ground control station for UAV, US Pat. Application no. 20070200027, Aerial robot, US Pat. Application no. 20070129855, Device and Method of Automated Construction of Emergency Flight Path for Aircraft, US Pat. Application no. 20070069083, Self-Contained Avionics Sensing And Flight Control System For Small Unmanned Aerial Vehicle, US Pat. Application no. 20070051848, Landing gear for a hovercraft, US Pat. Application no. 20070034738, Aerodynamically Stable VTOL Aircraft, US Pat. Application no. 20070018052, A system and method for inflight control of an aerial vehicle US Pat. Application no. 20060231675, Gyro-stabilized air vehicle, US Pat. Application no. 20050082421, Flying machine, US Pat. Application no. 20040094662, Vertical tale-off landing hovercraft, US Pat. Application no. 20020113165, Aircraft and control system US Pat. Application no. 20020003188, Single Passenger Aircraft, U.S. Pat. No. 7,302,316, Programmable autopilot system for autonomous flight of unmanned aerial vehicles U.S. Pat. No. 7,299,130, Unmanned vehicle, U.S. Pat. No. 7,289,906, Navigation system applications of sigma-point Kalman filters for nonlinear estimation and sensor fusion U.S. Pat. No. 7,249,732, Aerodynamically stable, VTOL aircraft, U.S. Pat. No. 7,231,294, Navigating a UAV, US Pat. No. 7,158,877, Waypoint navigation, U.S. Pat. No. 7,044,422, Gyrostabilized self propelled aircraft using ducted, magnetic induction air-impeller rotors, U.S. Pat. No. 6,883,748, Vehicles particularly useful as VTOL vehicles, U.S. Pat. No. 6,873,886, Modular mission payload control software, U.S. Pat. No. 6,847,865, Miniature, unmanned aircraft with onboard stabilization and automated ground control of flight path, U.S. Pat. No. 6,721,646, Unmanned aircraft with automatic fuel-to-air mixture adjustment, U.S. Pat. No. 6,712,312, Reconnaissance using unmanned surface vehicles and unmanned micro-aerial vehicles, U.S. Pat. No. 6,694,228, Control system for remotely operated vehicles for operational payload employment, U.S. Pat. No. 6,665,594, Plug and play modular mission payloads, U.S. Pat. No. 6,622,090, Enhanced inertial measurement unit/global positioning system mapping and navigation process, U.S. Pat. No. 6,604,706, Gyrostabilized self propelled aircraft, U.S. Pat. No. 6,588,701, Unmanned mobile device, U.S. Pat. No. 6,575,402, Cooling system for a hybrid aircraft, U.S. Pat. No. 6,488,232, Single passenger aircraft, U.S. Pat. No. 6,450,445, Stabilizing control apparatus for robotic or remotely controlled flying platform, U.S. Pat. No. 6,422,508, System for robotic control of imaging data having a steerable gimbal mounted spectral sensor and methods, U.S. Pat. No. 6,270,038, Unmanned aerial vehicle with counter-rotating ducted rotors and shrouded pusher-prop, U.S. Pat. No. 6,170,778, Method of reducing a nose-up pitching moment on a ducted unmanned aerial vehicle, U.S. Pat. No. 6,073,882, Flying vehicle with retractable wing assembly, U.S. Pat. No. 6,065,718, Universal VTOL power and rotor system module, U.S. Pat. No. 5,941,478, STOL/VTOL free wing aircraft with modular wing and tail, U.S. Pat. No. 5,890,441, Horizontal and vertical take off and landing unmanned aerial vehicle, U.S. Pat. No. 5,863,013, STOL/VTOL free wing aircraft with improved shock dampening and absorbing means, U.S. Pat. No. 5,779,188, Flight device, U.S. Pat. No. 5,695,153, Launcher system for an unmanned aerial vehicle, U.S. Pat. No. 5,575,438, Unmanned VTOL ground surveillance vehicle, U.S. Pat. No. 5,575,438, Unmanned VTOL ground surveillance vehicle, U.S. Pat. No. 5,419,513, Ancillary aerodynamic structures for an unmanned aerial vehicle having ducted, coaxial counter-rotating rotors, U.S. Pat. No. 5,407,150, Thrust unit for VTOL aircraft, U.S. Pat. No. 5,372,337, Unmanned aerial aircraft having a single engine with dual jet exhausts, U.S. Pat. No. 5,351,913, Coaxial transmission/center hub subassembly for a rotor assembly having ducted, coaxial counter-rotating rotors, U.S. Pat. No. 5,297,759, Rotary aircraft passively stable in hover, U.S. Pat. No. 5,277,380, Toroidal fuselage structure for unmanned aerial vehicles having ducted, coaxial, counter-rotating rotors, U.S. Pat. No. 5,226,350, Drive train assembly for a rotor assembly having ducted, coaxial counter-rotating rotors, U.S. Pat. No. 5,170,963, VTOL aircraft, U.S. Pat. No. 5,152,478, Unmanned flight vehicle including counter rotating rotors positioned within a toroidal shroud and operable to provide all required vehicle flight controls, U.S. Pat. No. 5,150,857, Shroud geometry for unmanned aerial vehicles, U.S. Pat. No. 5,150,857, Shroud geometry for unmanned aerial vehicles, U.S. Pat. No. 5,145,129, Unmanned boom/canard propeller v/stol aircraft, U.S. Pat. No. 5,086,993, Airplane with variable-incidence wing, U.S. Pat. No. 4,982,914, Aircraft with a plurality of propellers, a pipe structure for thereon holdable wings, for vertical takeoff and landing, U.S. Pat. No. 4,478,379 Unmanned Remotely Piloted Aircraft, U.S. Pat. No. 4,071,206, Portable helicopter, U.S. Pat. No. 3,972,490, Trifan powered VSTOL aircraft, U.S. Pat. No. 3,768,757, Fluid-Borne Vehicle, U.S. Pat. No. 3,393,882, Coupling device for v. t. o. l. aircraft, U.S. Pat. No. 3,023,980, Turbo-fan lift device, U.S. Pat. No. 2,997,258, Helicopter type aircraft, U.S. Pat. No. 2,417,896, Helicopter flying apparatus, U.S. Pat. No. 2037745, Helicopter.

SUMMARY

In one embodiment, an improved supersonic hovering air vehicle is disclosed. Embodiments include aircraft with capabilities that as of this date not been possible: hover for an extended period of time, transition and dash at supersonic speeds for an extended period of time, then transition back to hover-mode flight and land. There are a host of small hovering aircraft that currently exist and usually take advantage of either a lightly loaded airplane propeller or ducted fan. Similarly, there are a host of supersonic projectiles and missiles which are capable of supersonic cruise, but there are no hovering aircraft which can supercruise and no supersonic aircraft which can hover out of ground effect for not just tens of seconds, but for an hour or more. Some embodiments of the present invention allow for both an efficient hover and efficient supersonic cruise state. A typical mission profile could include a vertical launch state, followed by: undercarriage retraction and transition to high-speed mode flight at which time the rotor would be used as a propeller through the subsonic flight regime. As the aircraft approaches the transonic flight regime, the propeller stops and stows, enabling the aircraft to penetrate the sound barrier on jet thrust alone as the rotor is declutched from the rotor system. The aircraft penetrates the sound barrier and cruises out to the target of interest. Upon arrival the aircraft slows down to subsonic flight, activating the rotor, transitioning to hover mode flight while it completes its mission. Following mission completion, it then returns to the launch base with a similar sequence of events.

In one embodiment, the aircraft itself is laid out to take advantage of efficient aerodynamic shaping in many flight modes while employing substantially neutral inherent stability. The efficient aerodynamic shaping is one aspect of some embodiments as it is useful that drag be relatively low, weight be kept low and therefore efficiency high. Similarly, neutral stability is another aspect that reduces gust sensitivities, which also reduces possibilities of "pitchback instability" which plagues most ducted fans is avoided. The implementation of neutral stability allows the aircraft to be exposed to aerial disturbances and right itself via a series of simple feedback loops. If high levels of inherent stability were employed in the vehicle in one flight mode, it would prove destabilizing in another flight mode.

Flight performance when considering hover mode stability is another aspect of some embodiments as compared to configurations like ducted fans. Some of the most famous crashes of ducted fan systems have occurred because the flow over a ducted fan in a gusty environment induces a pitching moment away from the direction of the oncoming gust. This inherent pitchback moment necessitates the application of nontrivial levels of correcting forces. In many ducted fan configurations, such force application is away from the direction of the oncoming gust, which means that if the aircraft can maintain vertical flight without flight control surface saturation, the cross-fuselage drag combined with control force application generally leads to large lateral translations before recovery can be attempted. Because some embodiments of the present invention can directly counter oncoming gusts both with thrust vectoring in the tail and full cyclic controls on the rotor, pitchback in gust fields is of reduced concern. Further because the normal force gradient over the empennage is higher than the forward fuselage in gusty environments, in some embodiments the aircraft exhibits neutral stability, inherently. Again, this is another aspect in comparison to the state-of-the-art in vertical take-off and landing coleopters.

In some embodiments, the aircraft configuration is constructed from an unusual combination of synergistic features. The aircraft can include a central body which is generally shaped like a Sears-Haack shape for minimization of supersonic drag. The forward potion of this fuselage houses the guidance, navigation, control, communications mission payload and observation packages. Just below this bay is the primary upper fuel bay, followed by the articulated counter-rotating rotor assembly, lower fuel bay, shaft power engine bay, supersonic engine bay, and thrust vectoring assembly. The rotors, being articulated and capable of pitch rotations through 90° and lag angles through nearly 90° are capable of aligning themselves along the longitudinal axis of the body. In doing so, the aircraft drag is minimized for high speed flight. Similarly, the undercarriage is stowed in the leading edges of the empennage and deploys either symmetrically or differentially to accommodate changes in ground slope or obstacles.

Several aspects of this configuration are easily seen with respect to conventional convertible aircraft like ducted fans. One aspect of the lack of a ducted fan is that the total aircraft wetted area is minimized. A ducted fan contains wetted surfaces both inside and outside of the duct which induce scrubbing drag. Because the dynamic pressure ratio inside of the duct is larger than the freestream, the extra drag from the inside of the duct is damaging to aircraft performance both in hovering flight and in transitioned forward flight. Further, because a ducted fan typically uses struts of some configuration for structural stability, those struts generate nontrivial levels of drag as well. Because the present invention has neither a duct nor any of the associated structures, the total low subsonic airframe drag is less than that seen in a ducted fan type configuration.

Another aspect of some embodiments in comparison to a ducted fan is that the drag components associated with high subsonic, through transonic, and supersonic flight will generally not be present. Truncated ducts with rounded leading edges (for good hover performance on a duct) are prone to transonic choking. This transonic choking precludes the generation of usable thrust levels to propel the aircraft through the speed of sound.

Because the ducted fan configurations deviate from the Sears-Haack shape for minimum transonic and supersonic drag, ducted fans are inherently less desirable with flight beyond the mid-subsonic. Some embodiments of the present invention employ no duct, such embodiments can pass through the transonic and sustain supersonic cruising flight.

Unlike conventional supersonic aircraft, some embodiments of the present invention also possess a rotor of large diameter for take-off, landing, low speed and hover mode flight. When a conventionally configured supersonic aircraft (be it a supersonic transport, fighter, missile etc.) is maneuvered to a hovering flight mode (which has been done several times before), because the aircraft typically employs the use of turbojet, turbofan or rocket engines, the equivalent disk loading in hover mode flight often exceeds many thousands of pounds per square foot. Such is the case for the AV-8B Harrier and the US Navy's new MK-234 Nulka missile. With equivalent disk loadings of more than 3,000 lbf/ft2, the Nulka can achieve hover endurances of tens of seconds because the power flow required to sustain such flight is extreme. Similarly, the AV-8B Harrier has more than 1,800 lbf/ft2 of equivalent disk loading in hover. Although slightly better than the Nulka, its hover endurance is also limited. This is primarily because of a fundamental relationship which exists between the disk loading and the power required. From basic Momentum Theory, the Power, P can be related to the Thrust, T, Air Density, ρ, and actuator disk area, A and propulsion unit diameter, D (if considering a round ejector) as follows:

$$P \propto \frac{T^{3/2}}{\sqrt{\rho A}} \propto \frac{T^{3/2}}{D\sqrt{\rho}} \quad (eq.\ 1)$$

Another way of looking at equation 1 is to examine it through the parameter of disk loading, DL.

$$P \propto T\sqrt{\frac{T/A}{\rho}} = T\sqrt{\frac{DL}{\rho}} \quad (eq.\ 2)$$

If a given hovering aircraft has a higher disk loading than another one to sustain vertical flight, then the power (and accordingly fuel consumption) is higher. The existing hovering high speed aircraft like today's Nulka and Harrier and past aircraft like Heinkel Messerschmitt VJ 101 "Vertikal Jäger" VTOL Tiltjet aircraft have disk loadings in the thousands of pounds per square foot, and the efficiencies were and are limited in hovering flight. Embodiments of the present invention have a disk loading of under 100 lb/ft2. Other embodiments have a disk loading of under 10 lb/ft2, and still other embodiments have disk loadings of approximately 1 lb/ft2. This rotor unloading leads to improvements in hovering efficiency with respect to high speed aircraft of today. Because one to two orders of magnitude less fuel is burned by some embodiments of the present invention, the hover endurance with respect to these other aircraft will similarly be expanded by one to two orders of magnitude. While the Nulka can hover for one to two minutes, some embodiments of the present invention can, with the same loadout and launch volume, hover for one to two hours.

Although there are a handful of coaxial, counterrotating rotorcraft in service including the Canadair CL 227 and 327 (U.S. Pat. No. 4,478,379), this present invention has some aspects that differ from those axisymmetric, coaxial hovering aircraft configurations. Because these so-called "flying peanut" designs were specifically designed for hover, they have disk loadings which are low enough to sustain the mission at hand, in hover. However, they are slow in forward flight. The primary reason is that they are only designed to fly like a helicopter with their rotor system oriented mostly in the horizontal position. As a result, the advancing blades suffer from transonic effects while the retreating blades suffer from separated flow effects. Because the oncoming flow hits the fuselage at 90°, the cross-fuselage drag is high as well. All of these effects combine to retard both the maximum forward flight speed and range. Because some embodiments of the present invention possess a forward flight mode which allows supersonic flight, the range and maximum flight speeds of some embodiments of the present invention are both more than an order of magnitude greater than the axisymmetric coaxial hovering aircraft.

The combination of a counterrotating mid-body rotor system combined with a Sears-Haack shape and mixed shaft-jet propulsor configuration makes some embodiments of the present invention capable of performing missions that no other aircraft can do. Because in some embodiments the aircraft is capable of hovering for extended periods of time with high hovering out of ground effect (HOGE) thrust-to-weight ratios (T/W), the aircraft is able to maneuver in gusty environments that are often closed to low HOGE T/W aircraft.

Another aspect that some embodiments of the present invention have over existing ducted fan configured aircraft is that given thrust vectoring in vertical flight, combined with rotor cyclic and collective control, the aircraft is capable of flight maneuvers which do not rely upon body rotations for translation. This aspect of some embodiments differs in comparison to body rotation aircraft especially when maneuvering in confined areas.

Although the XFY-1 and the XFV-1 did not use ducted fans for vertical flight, they relied upon empennage deflections for vertical flight mode pitch, roll and yaw control. These control deflections then lead to changes in body attitudes which, in turn, would then translate the aircraft. It was discovered in flight test that such body rotations could be extremely dangerous as portions of either undercarriages or empennages would strike the ground unevenly during these pitch, roll and yaw maneuvers. Because some embodiments of the present invention do not rely upon body rotations for hovering flight control force generation, they are capable of translation without body rotation. Further, the control authority afforded by a collective-cyclic enabled rotorcraft differs from that of simple deflected slipstream, lending greater maneuver margins in gusty environments.

Because the rotors may be grown in length, the rotor diameter can be made quite large. Such an unloading of the rotor assists in maintaining high hover efficiency. However, it is also important for noise reduction as high disk loading is one of the main factors behind the high noise signatures of many ducted fan hovering aircraft.

The low hover-mode disk loading of some embodiments of the present invention are other aspects when considering operations over loose terrain such as sand. Ducted fans, propeller driven aircraft and tilt-jet aircraft often suffer from miniature sandstorms which are induced during low altitude operations. The low disk loading of some embodiments of the present invention will help mitigate problems associated with high exhaust jet-velocity ground impingement.

Another aspect of this configuration is that it can be sized for compressed carriage and delivery from a variety of containers and bays. Among them are weapon bays on a variety of aircraft and torpedo tubes. Depending on scale, some embodiments of the present invention can also be sized for launch from many munitions tube from flares to howitzer to mortar and antitank guns. This feature affords some embodiments of the present invention a level of utility over competing systems of many classes including ducted fans, missiles and conventional axisymmetric coaxial hovering aircraft.

The general aircraft configuration in at least one example embodiment is composed of a central fuselage containing multiple bays with varying internal components and functions, a pair of counterrotating rotors, a powerplant assembly driving the rotors, an empennage assembly which is integrated with two axis thrust vectoring and an undercarriage assembly. During hovering flight, the rotors are mostly extended with coning angles optionally close to zero. The undercarriage assembly can unfold along the length of the empennage either symmetrically or differentially to land on uneven terrain. Flight control in hover is maintained in pitch and roll by cyclic rotor control as well as optional thrust vectoring, and yaw by differential torque on the counterrotating rotors. Flight control in supersonic configuration is maintained by differential deflections of flight control surfaces on the empennage and/or thrust vectoring. In one embodiment, pitch and yaw is controlled by thrust vectoring and roll is controlled by differential deflections of the empennage. Following a vertical launch, the aircraft can transition through a hover, then pitch over to a high speed flight attitude. As the aircraft accelerates along its longitudinal axis, the rotating rotor blade pitch can increase while the rotor speed slows with respect to the airframe. Ultimately, the rotors can cease rotation with respect to the airframe, lock in place and sweep back as the aircraft accelerates on the power of an integrated engine capable of producing jet thrust. Embodiments of the aircraft are also capable of transitioning back to hover flight and landing vertically.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein is not necessarily intended to address every object described herein, and each embodiment does not necessarily include each feature described. Other forms, embodiments, objects, advantages, benefits, features, and aspects of the present invention will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

DESCRIPTION OF THE DRAWINGS

Some of the figures shown herein may include dimensions or may have been created from scaled drawings. However, such dimensions, or the relative scaling within a figure, are by way of example, and not to be construed as limiting.

DETAILED DESCRIPTION OF THE ILLUSTRATED EMBODIMENTS

Figure 1:
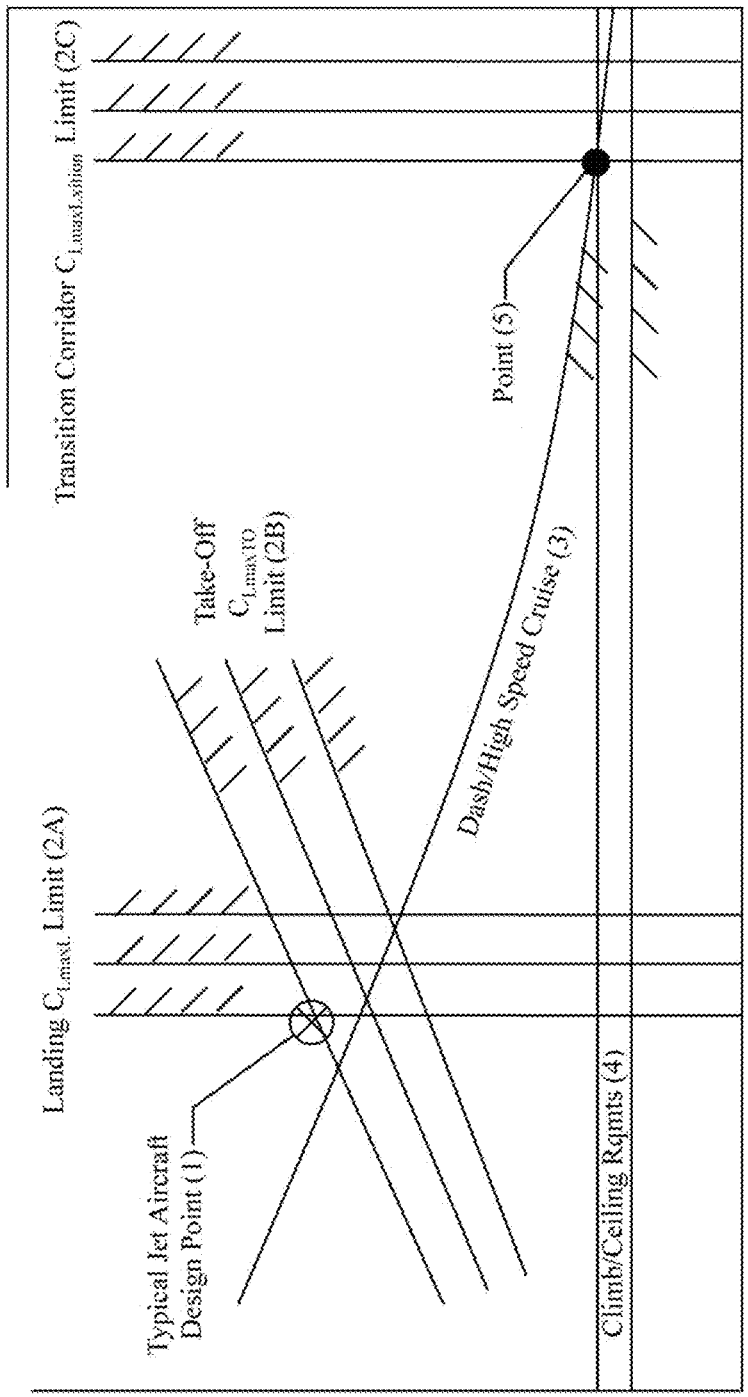
FIG. 1 shows a generic sizing chart as is used to size fixed-wing jet-propelled aircraft of many categories, several sizing boundaries, a typical jet aircraft design point and the location of one design point (Point (5)) of some embodiments of the present invention.

For the purposes of promoting an understanding of the principles of the invention, reference will now be made to selected embodiments illustrated in the drawings and specific language will be used to describe the same. It will nevertheless s be understood that no limitation of the scope of the invention is thereby intended; any alterations and further modifications of the described or illustrated embodiments, and any further applications of the principles of the invention as illustrated herein are contemplated as would normally occur to one skilled in the art to which the invention relates. At least one embodiment of the invention is shown in great detail, although it will be apparent to those skilled in the relevant art that some features or some combinations of features may not be shown for the sake of clarity.

Any reference to "invention" within this document herein is a reference to an embodiment of a family of inventions, with no single embodiment including features that are necessarily included in all embodiments, unless otherwise stated. Further, although there may be references to "advantages"

provided by some embodiments of the present invention, it is understood that other embodiments may not include those same advantages, or may include different advantages. Any advantages described herein are not to be construed as limiting to any of the claims.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter are presented as examples only and do not limit the applicability of other compositions of matter, especially other compositions of matter with similar properties, unless otherwise indicated.

The majority of professionally designed aircraft in use both in years past and s today have been fundamentally laid out using a graphical-analytical tool called a sizing diagram as shown in FIG. 1. This tool relates the laws of physics and the laws of man governing aircraft to various classes of aircraft by describing boundaries of wing loading (Weight/Wing Area, W/S) and Thrust-to-Weight Ratio (T/W) where flight is possible and not possible. Accordingly, one way to describe some embodiments of the present invention in terms of how it is laid out, what it does and how it performs is via a sizing chart as shown in FIG. 1. For reference, a typical conventional aircraft (a jet in this case, but propeller aircraft can be sized there as well), can be placed on this sizing chart (1).

Because conventional jet aircraft and many uninhabited aircraft which are jet (or propeller) propelled rely upon a runways or catapult launches, there exist a series of bounding lines typically governed by the maximum lift coefficient associated with the flight phase, 2A corresponds to Landing limits, 2B corresponds to takeoff limits on CLmaxTO. These bounding lines generally move lower and towards the right on the chart with increasing CLmaxTO, allowing the designer to move the aircraft design point to the right (indicating a smaller wing area—typically good for high speed performance), and/or further down (indicating a smaller and less expensive engine).

Conventional aircraft are also bounded from below by a myriad of climb and ceiling restrictions generally coming from a given mission specification, profile, regulation or customer demand. Because most jet aircraft land conventionally, a series of right bounded lines also bracket conventional jet aircraft in from the right as a function of the maximum lift coefficient possible on landing, CLmaxL (2B). Between these and other bounds, most aircraft including many uninhabited aerial vehicles (UAVs), have comparatively low wing loadings with respect to what they could have if the sizing bounds were not there. A common way to push the aircraft sizing a bit to the right is to demand ever higher lift coefficients, but this comes at the price of cost and complexity of high lift systems.

Because simplicity is useful, complex high lift systems like multi-slotted translating flaps are not typically considered. Rather, low speed (down to a hover) performance in some embodiments of the present invention is satisfied by a relatively lightly loaded, counterrotating body centerline rotor system. This system is designed to handle lift requirements from hover through at least mid-subsonic flight regimes. Given that the rotor system, its thrust and associated normal force generation characteristics are designed to sustain lift equilibrium and provide control forces through at least the mid-subsonic flight regimes, the fixed-wing CLmax associated sizing lines on FIG. 1 (2A, 2B) are not necessarily useful with some embodiments of the present invention. Rather, some embodiments of the aircraft are sized by CLmax limits during transition from hover through high speed flight, dash, ceiling and climb requirements (2C, 3, 4). Because these boundaries coalesce at higher wing loadings, the design point for some embodiments of the present invention is farther to the right than conventional aircraft (refer to Point (5)). This, of course, indicates that a smaller fixed wing may be used to sustain lift under these conditions. Accordingly, in some embodiments, the stopped rotor projected area matches these requirements. This leads to a decrease in wetted area over a conventionally configured aircraft, which in turn cuts weight, volume and drag while increasing range and high speed performance. Increases in wing loading over conventional aircraft are possible given the configuration of some embodiments of the present invention because of this elimination of the CLmaxL and CLmaxTO sizing boundaries.

Figure 2:
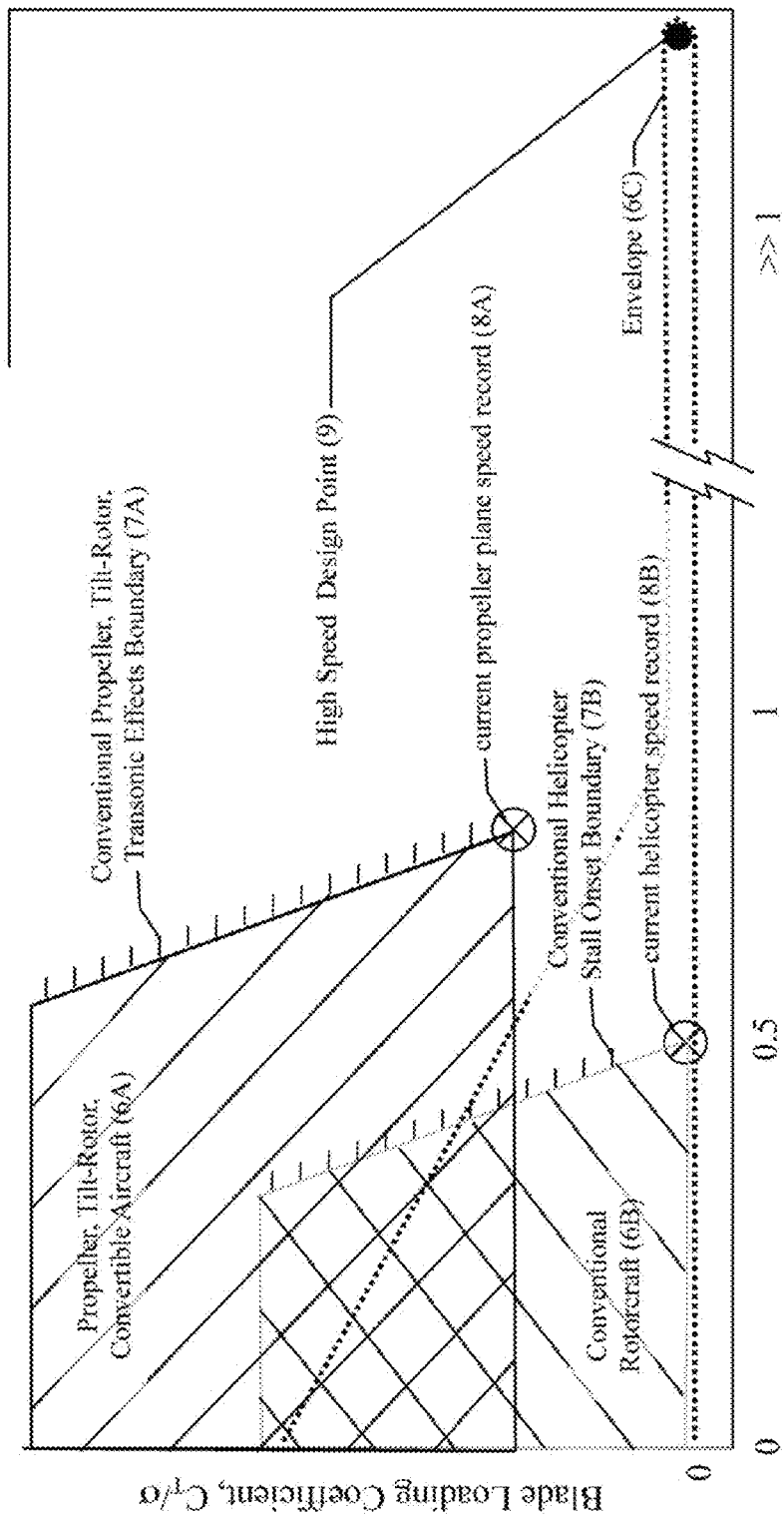
FIG. 2 shows a general Mach, Advance Ratio and Blade Loading comparing conventional helicopters, propeller driven airplanes, convertible propeller driven aircraft and some embodiments of the present invention (Point (6c) and (9)) from hover through supersonic flight speeds.

If one examines the entire flight speed range from hover (Mach, M=0), through high speed, supersonic dash speeds, one can further see the differences between some embodiments of the present invention and conventional aircraft. FIG. 2 shows the Blade Loading Coefficient, $CT/\sigma$—Mach number envelopes of conventional rotorcraft, propeller driven aircraft and some embodiments of the present invention. From FIG. 2, conventional propeller-driven airplanes, tilt-rotor aircraft (like the XV-15 and V-22 Osprey) and convertible aircraft (like the XFY-1 and XFV-1 Pogo) employ various rotary propulsors like propellers and rotors are firmly bounded (6A). The lower bound is formed by size requirements which typically call for loading levels higher than helicopters. The right bound, 7A is formed by transonic effects on the propulsor systems. In any case, the maximum sustained, level flight speeds are below Mach 1 because of propulsion limitations. The current conventional propeller-driven aircraft world speed record is just at the lower edge of the transonic flight regime (8A).

If one examines the conventional rotorcraft (like helicopter) envelope, 7B, one can see that it sits at a lower loading level with lower top-end speeds. Of course, given lower total disk loading, the efficiency in hover is greater than the aircraft described in 7A (as seen by equation 2). With an advance ratio bounded by approximately 0.5, conventional rotorcraft typically cannot go fast because of the hard and fast stall onset boundary (7B) as well as transonic effects on the advancing blades. The current helicopter world speed record was achieved by an essentially unloaded helicopter with an accordingly lightly loaded rotor flying in a partially compound rotorcraft mode (8B). At an advance ratio of 0.5, this flight speed was well below Mach 1 and far below the maximum flight speed achieved by propeller driven aircraft and convertible aircraft.

Some embodiments of the present invention utilize full flight conversion from hover-mode flight to high speed jet-based flight via a flight conversion sequence. Because some embodiments of the present invention are able to fold the rotor back to an extremely low drag configuration, the transonic, then supersonic, drag coefficients are lower than conventional aircraft. This allows aircraft according to some embodiments of the present invention to penetrate the sound barrier The mode of propulsion through the transonic flight speed, then into the supersonic flight regimes is something other than the rotor. Accordingly, a form of jet propulsor is useful in this aircraft design. The result is an operational Mach range as seen in FIG. 2. The multi-mode propulsion envelope stretches from Mach=0 into the supersonic flight regime (6C). The high speed design point of some embodiments of the present invention is at a location where the blade loading is essentially undefined (as the only airloads the folded blades see are associated with strake-load lift sustainment, pressure and skin friction drag). One design point, 9, lies at a location where only a handful of VTOL aircraft have ever reached. Because these other VTOL aircraft are not capable of sustained vertical flight modes or sustained supersonic dash speeds, their flight envelopes were not included in this profile.

Figure 3:
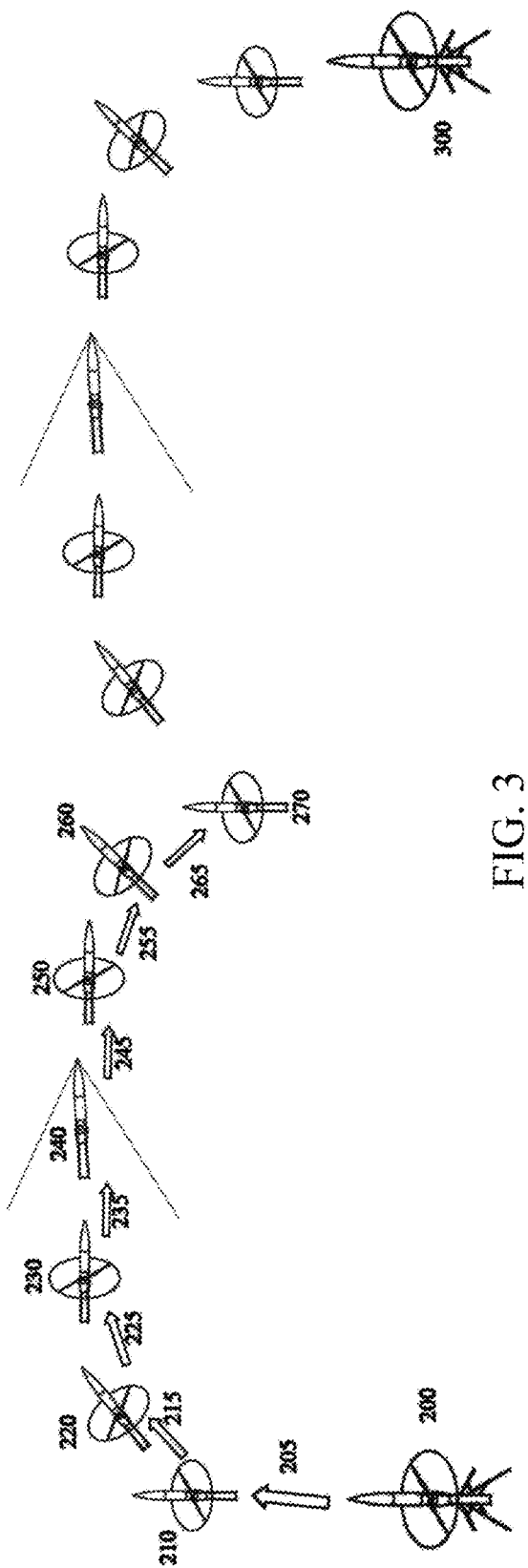
FIG. 3 shows a representative mission profile for one embodiment of the present invention

The operational characteristics of some embodiments of the present invention are fairly straightforward as follows: FIG. 3 shows one embodiment of the present invention in a VTOL launch configuration, 200. Following launch, a vertical ascent, 205, is commanded to a transition altitude 210 through which the aircraft flies. The forward flight speed is increased in full rotorcraft mode into the drag bucket, then through to ever more horizontal aircraft longitudinal axis orientations in the early transition flight phase, 220, as the transition from hover-mode flight to high speed flight is made. During this time, the aircraft is kept in trim by rotor cyclic and collective, jet thrust vectoring and empennage deflections. The forward flight speed is increased further, as lift generated from raw rotor thrust is by augmented rotor normal force. During the late transition flight phase, 225, the aircraft will accelerate further to maximum rotor mode converted flight speed, 230. As the aircraft reaches the maximum speed possible by pure rotor-mode flight, a second conversion from rotor-to-jet mode flight is made, 235. During this flight phase, the rotor is stopped and folded back a number of degrees. As the rotor is folded back, the total aircraft drag is decreased because of the sweep effect and the rotor propulsor is accordingly unloaded via active clutching. It should be appreciated that the terms "rotor" and "wing" are used to describe the same aerodynamic structure that is capable of providing lift while rotating (similar to a rotary wing aircraft) and when not rotating (similar to a fixed wing aircraft). During this second conversion, the high speed propulsor provides ever more thrust for jet-mode flight. There are a myriad of propulsors which will work for jet-mode flight, including Brayton-cycle engines—ramjets (engines that generate thrust by compressing air, introducing and igniting fuel, and exhausting the combustion products without requiring the rotating machinery of turbine engines), turbines of many kinds, multi-cycle engines, afterburning turboshaft engines and even afterburning piston engines. Gluhareff-cycle engines can be used throughout the entire flight regime. Whichever engine type is used, the rotor is typically disengaged, such as by declutching, as the rotor would be unable to efficiently convert shaft power to thrust in this flight mode.

The aircraft would then accelerate further, faster through the supersonic flight regime and cruise at supersonic flight speeds, 240. During this cruise, one powerplant type would be a Gluhareff-cycle assisted turboshaft with secondary air passage divert for supersonic flight.

Conversion back to subsonic, 245, is simply accomplished by throttling back. High speed to rotor mode conversion is accomplished again by performing conversion 235 in reverse. The rotor simply unfolds (sweeps forward) and restarts. Ram air during conversion is useful for air-starting turboshaft engines and is one preferred embodiment. Steady converted, horizontal-rotor mode flight is, once again, a transitional phase, 250, as the aircraft further decelerates through transition to rotorcraft mode, 255. The major difference in transitional flight modes occurs here between 255, 260, and 265 as a great deal of kinetic energy is burned up so that the aircraft can enter a hover mode, 270. The way to accomplish this is through a simple zoom climb to burn off airspeed, then back down to a stable hover mode, 270.

The second half of one mission profile is simply notional as a given mission may contain three, four five or any number of conversion legs, loiter segments, dashes and/or transitions. Accordingly, the flight phases between 270 and landing 300 are left unlabeled as they are strictly notional.

Figure 4:
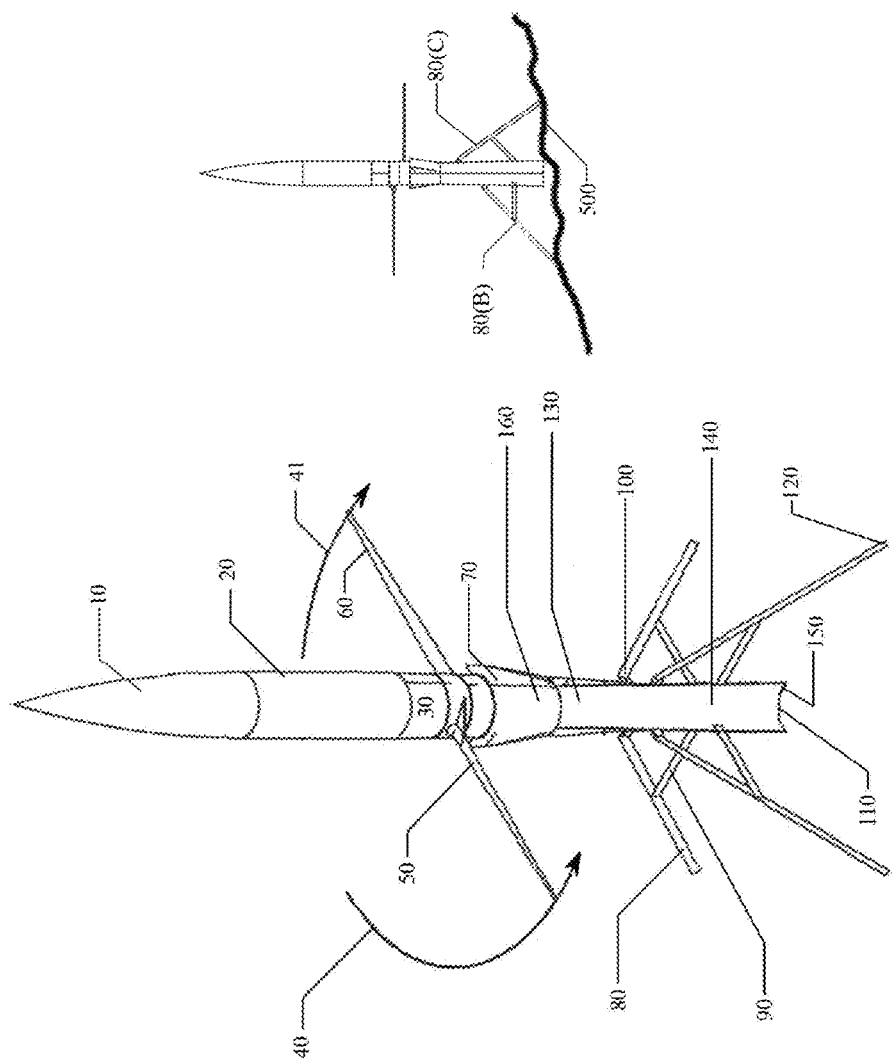
FIG. 4 shows the landing and take-off configuration of the embodiment of FIG. 3 in the two-bladed variant.

FIG. 4 shows the landing configuration of one embodiment of the present aircraft. The upper section of the aircraft (as is the rest of the aircraft), is shaped for efficient supersonic flight. A notional three-caliber tangent ogive shape 10 is shown, but it may be of any other suitable low-drag shape for the supersonic flight regime including blunt with airspike(s). Within the nose cone it is envisioned that many subsystems such as guidance, navigation, control, communications, flight directions, sensors and power conditioning to name a few. Avionics and instrumentation may be found in the forward section. Although they may also be placed elsewhere in the aircraft, one preferred placement is in the nose 10.

The forward fuselage bay 20 may house avionics, and also may include cargo and fuel given its closer proximity to the center of lift for the aircraft. The forward fuel bay 30 preferably includes provisions for storing for fuel and structural load transfer from the rotor system to the forward fuselage.

FIG. 4 shows a two-rotor, counterbalanced, single blade configuration according to another embodiment of the current invention. Each of the rotors spins in an opposite direction, 40, 41. The counterclockwise rotor 50 has a slender, high aspect ratio lightweight single blade which is vertically displaced above the counter-clockwise rotor 60. Both rotors have mass counterbalances and are controlled with collective, longitudinal and lateral cyclic. The rotors can be controlled and commanded through 90 deg feathering and lag angles. Of course, although high aspect ratio, straight tapered blades of low thickness-to-chord ratio (t/c) double circular arc or diamond airfoil cross-sections are preferred in some embodiments, they may be made from any suitable airfoil cross section, curvilinear, scimitar or aeroisoclinic in form and structure. The blade mass is balanced in some embodiments so that the lines of centers of gravity and/or the conglomerate center of gravity is in front of the lines of aerodynamic centers and/or integrated aerodynamic center. The preferred structural arrangement of the rotor in certain embodiments is that of a heavy leading edge followed by a semi-monocoque, monocoque or solid airfoil to the trailing edge.

The rotors 50, 60, are driven in different directions by any of a number of mechanisms including planetary gears housed within the rotor hub housing. This area also contains the pitch actuation mechanisms which may be electric, hydraulic or mechanical in nature and may or may not employ swash plates of a variety of geometries.

The propulsion inlets 70 are shaped and sized for both supersonic and subsonic flight regimes. The inlets open far enough and/or possess alternative opening doors or mechanisms to allow enough air to get in to feed the rotor propulsor in hovering flight while being small enough with an optional sharp lip to allow for supersonic flight. If the designer and/or operator prefer to optimize subsonic flight operation, then the inlets may be shaped with rounded lips. Also the inlets may be contoured, cambered or curved in any way which is suitable for subsonic flight so as to minimize pressure losses. Further in keeping with the principles of operating a Gluhareff engine, fuel injectors and preheat assemblies may be positioned anywhere suitable on the forward fuselage 20.

The scarf shown in 70 in some embodiments is used to appropriately generate an oblique shock for cruise at the design Mach number. The function of the inlet sections during supersonic flight is to slow the air down with minimal losses in stagnation pressure. This may be accomplished via any of a number of means including variations in cross-sectional areas, opening and/or closing valves and doors and curvilinear walls. The inlets themselves may also be articulated to allow for an optimization of opening area as a function of flight speed.

The undercarriage includes legs 80 and cross braces 90, although quite a number of combinations of generic legs and cross-braces will work. This undercarriage arrangement includes items that fold out to form a wide gait for landing on uneven ground 500. As the legs unfold, they may or may not be symmetrical depending on what ground level is sensed. If a lower slope is landed on, then one leg may move lower 80(B) while the other leg moves higher 80(C). The legs are designed to be retracted into the empennage so as to minimize drag in flight. However, the leading edges of the legs 80 may be exposed in some embodiments as they can be given shapes and sharp edges which are compatible with supersonic flight. The upper undercarriage hinge assembly 100 allows the legs to rotate around a forward grapple which is actively moved backwards and forward for both ground operations and flight. The aircraft is truncated at the thrust vectoring assembly 110 which allows for steering in pitch and roll in VTOL-mode flight and pitch and yaw in fully converted high speed flight. In alternate embodiments, the legs are capped with feet 120 which allow for landing and takeoff from unprepared surfaces and minimize surface scarring. They may be of any suitable shape, with the form of a basal cup being preferred in some embodiments.

Figure 5:
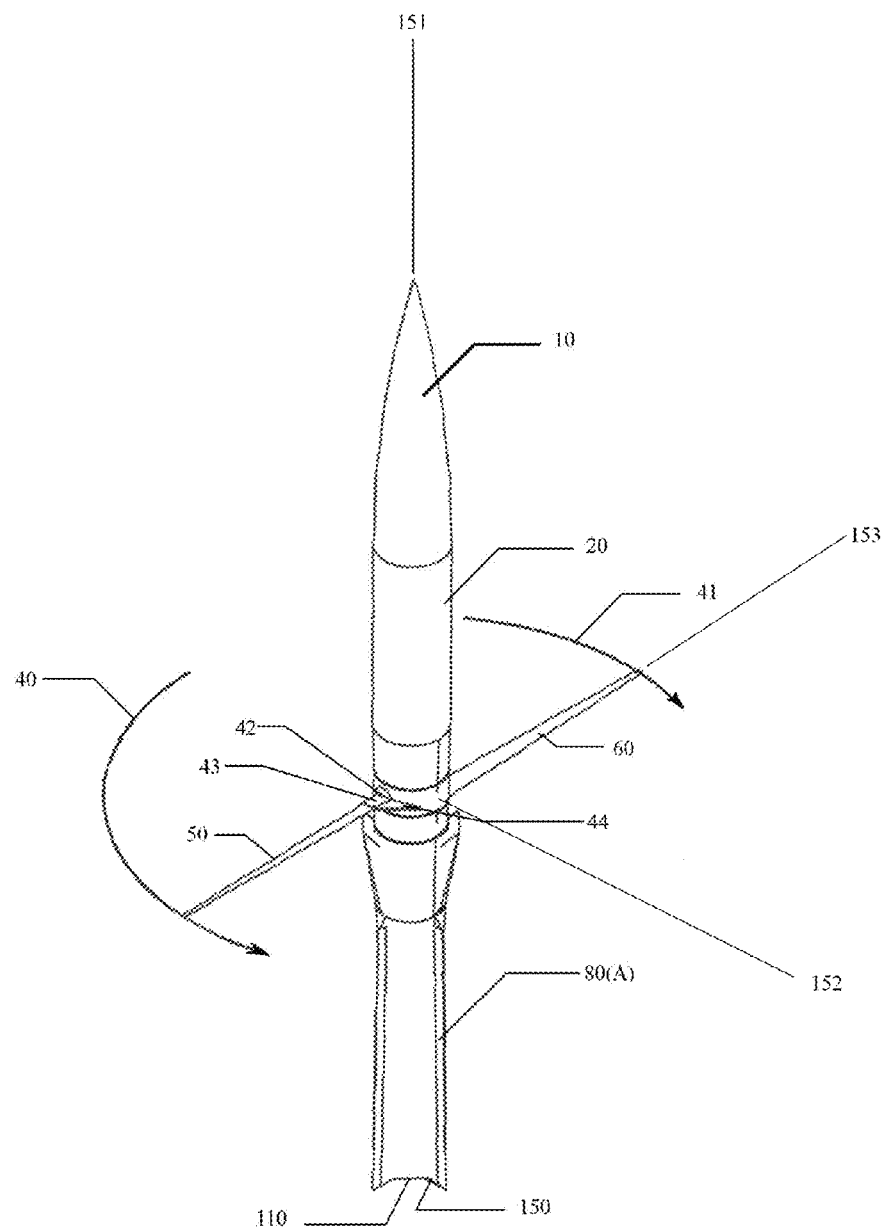
FIG. 5 shows the hovering configuration of the vehicle of FIG. 3 in the two-bladed variant.

FIG. 5 shows the configuration of some embodiments of the present invention in hover-mode, transitional and subsonic forward flight modes. The landing gear 80 is retracted into the empennage strake sockets. Flight stability and control are maintained around the three major body-fixed X, Y and Z axes, 151, 152, and 153 respectively. Roll commands and stability are maintained about the X-axis 151 by differential torques generated by the rotors 50, 60. To command torques in different directions, the counterrotating blades 50, 60 are commanded to different collective pitch positions which in turn imparts more or less roll about the X-axis 151.

Pitch stability and control is achieved by a combination of controls. First, pitch cyclic generates pitching moments about the Y-axis 152 by varying the blade pitch as a function of azimuth. These pitch commands are augmented by thrust vectoring coming from the thrust vectoring nozzle 110. Finally, the aft empennage control surfaces 150 are deflected to generate aerodynamic moments in pitch.

Yaw stability and control is achieved in the same way as pitch, but about the Z-axis 153. During hovering operations the combination of rotor cyclic and thrust vectoring allows the aircraft to execute close-quarters maneuvering via translations combined with body rotations (rather than just rotations). Because the aircraft can undergo body rotations through 90 deg., the aircraft flight director may employ quarternians to guide the aircraft.

As flight commands are either generated from within the aircraft via a stability augmentation system (SAS) likely located in the forward fuselage 110 and/or generated from outside the aircraft from an aircraft controller or flight director, the rotors are commanded in some embodiments to change pitch, as a function of azimuth. This is accomplished by a series of swash plates driven by servoactuators which may operate on electromagnetic, hydraulic or pneumatic principles. Also, solid state actuators using shape-memory-alloy, piezoelectric and/or any other form of adaptive material to achieve flight control actuation may be used. Simultaneously, the engine power and thrust is manipulated along with empennage deflections. Engine throttle (and therefore power and thrust levels) can be manipulated by any of the mechanical means listed below. Because at least two different engines are used in some embodiments, throttle can be controlled via any of the adaptive materials listed above. The flight control surfaces in the empennage 150 and thrust-vectoring assembly, 110 may also be controlled by any of the mechanisms above.

During hovering flight the undercarriage assembly may be retracted or left partially deployed for improved inherent stability about the y and z axes 152, 153.

As the aircraft moves through conversion from hovering to forward flight 225, 235, the wings are counterrotating at high speeds 40, 41. Conversion from hover to forward flight occurs in a conversion corridor defined by Minimum Vertical to Forward Conversion Flight Speed (MiVTFCFS) and Maximum Vertical to Forward Conversion Flight Speed (MaVTFCFS). Similarly, the act of conversion is also bracketed by minimum and maximum density altitudes, humidity and gust intensity levels.

Following conversion from hover-mode flight to low subsonic forward flight, the aircraft continues to be configured as shown in FIG. 5. Prior to conversion, the weight of the aircraft is primarily supported by raw rotor thrust, in line with the body X-axis, 151. Because conversion takes place with a body rotation about the body y-axis 152, the primary weight support direction will change from being oriented in line with the body X-axis 151 to being oriented along the negative body Z-axis 153. Because this places come of the lift generation now fundamentally normal to the rotor, one lift generating mechanism in this flight mode is via rotor normal force, primarily along the negative body Z-axis 153.

As the flight speed is increased further and further in the subsonic flight regime, the aircraft will reach Rotor-to-Fixed Conversion Flight Speed (RTFCFS). Associated with RTFCFS are minima and maxima along with bounds on density altitude, humidity and turbulence among other atmospheric considerations. The Rotor-to-Fixed (RTF) conversion will take place in several stages. First, the aircraft ascends to a safe altitude to allow for full transition and accelerates so that an amount of the lift can be generated by the body alone. Second, the aircraft enters the RTF transition mode at a comparatively low body angle of attack as the rotors will still be counterrotating 40, 41 at high speeds. Third, the rotor rotational speed is gradually slowed as the rotor pitch angles is increased about the feathering hinges 42. As the rotor pitch angles increase further, the feathering levels keep increasing through higher and higher angles till the blade chord lines are nearly aligned with the body X-axis 151. At this point, the rotors cease rotating about the body X-axis 151 and stay locked in a mostly horizontal position, primarily oriented root-to-tip along the body Y-axis 152. For stability the stopped rotor now forms a pair of fixed wings and may be canted slightly to possess dihedral for generation of rolling moments with respect to sideslip angles, $C\ell_\beta$. At subsonic stopped rotor flight speeds, the rotors are stopped and substantially locked with respect to the fuselage.

Figure 6:
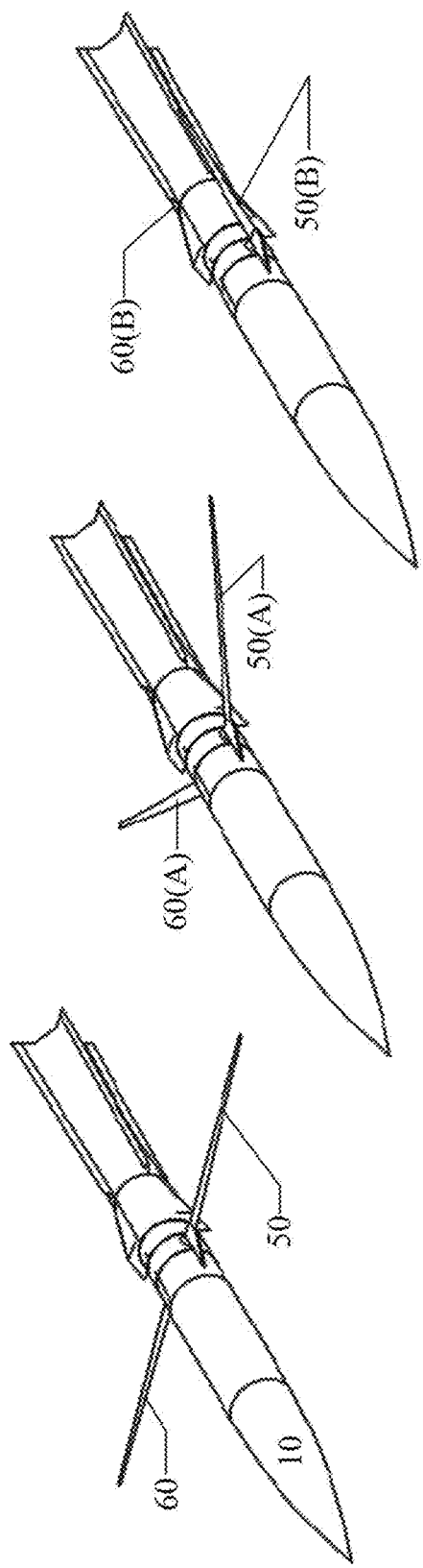
FIG. 6 shows the high speed configuration of the vehicle of FIG. 3 in the two-bladed variant.

FIG. 6 shows the configuration of the aircraft above subsonic stopped rotor flight speeds. Just following rotor stoppage and associated rotational lock so that they no longer spin around the body X-axis 151, the rotors are feathered so that they lie primarily in the X-Y body plane. Of course, because separate mechanical motion producing mechanisms (one embodiment uses servoactuators), can independently pitch the stopped rotors (now wings), a finite incidence angle is commanded. This wing incidence angle is enough to generate efficient lift and allow the body to fly with a low deck angle to minimize cross-fuselage drag. As the vehicle gains in flight speed, again, under the thrust of a jet or rocket propulsion mechanism, the wings (formerly configured as rotors), 50(A), 60(A) sweep back in a direction that is non-parallel to the plane in which the wings were rotating. In certain embodiments, the wings sweep in a direction that is approximately perpendicular to the plane in which the wings were rotating, and can be in a direction that is approximately parallel to the airstream. This action of increasing sweepback can be controlled by any of a number of mechanical mechanisms, electromechanical mechanisms, or adaptive materials including shape-memory-alloys. Example mechanisms include mechanical springs that allow the wings to sweep as aircraft speed increases and actuators that actively adjust the wing sweep as a function of airspeed and/or Mach number. In addition to reducing transonic drag on the wings, the sweep can be used for the maintenance of proper aerodynamic center and center of pressure position. This gross sweep action can therefore be used to properly manipulate the static margin through the transonic and supersonic flight regimes.

In certain high speed flight regimes, the dynamic pressures become high enough that body lift alone can efficiently support flight. Accordingly, the wings 50(B), 60(B) (formerly configured as rotors (50, 60)) can be folded into a series of tight-fitting planar lengthwise slots. This tends to minimize several forms of drag. In such a configuration, the wings may even be rotated to angles which allow for efficient cruise as a waverider by folding not into slots separated by 180°, but rather by 120° or 90°.

Figure 7:
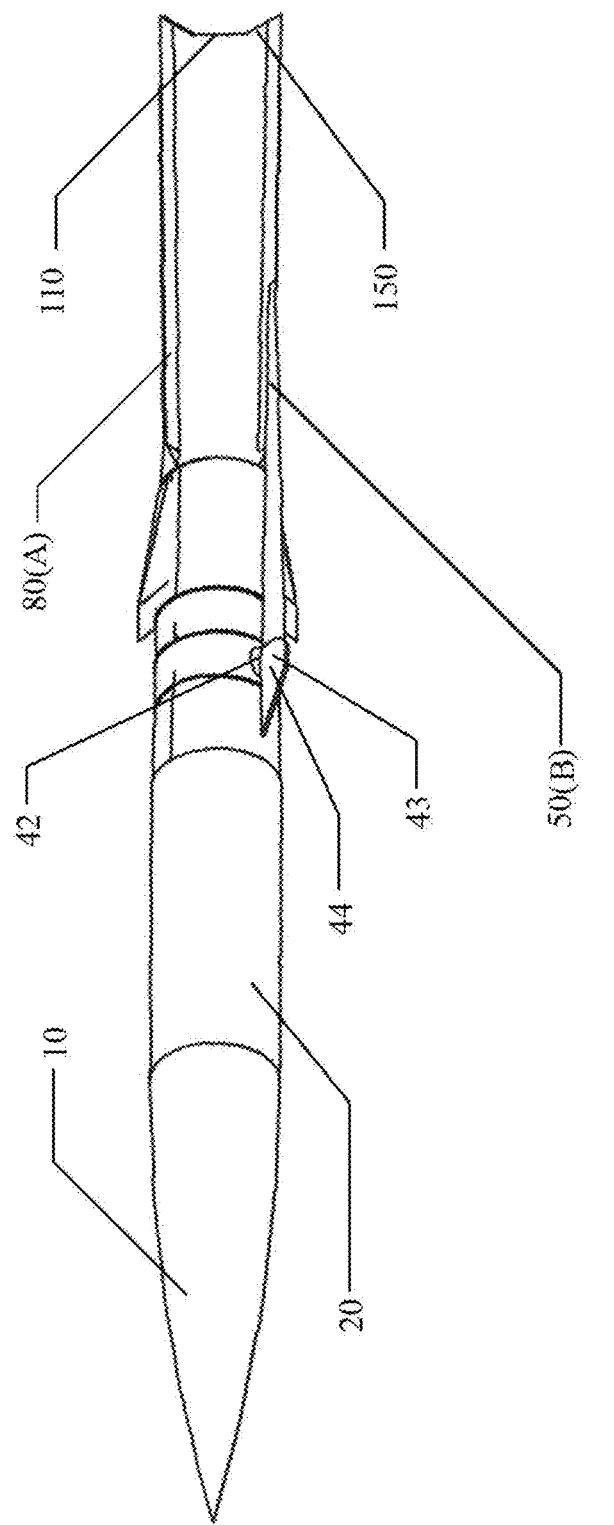
FIG. 7 shows the vehicle of FIG. 3 with launch booster rocket for tube launch.

FIG. 7 shows the high speed stowed wing high speed flight configuration. It should be noted that the folded landing gear assembly 80A is stowed within the aft fuselage strakes or forms said strakes in the folded configuration. In this high speed flight configuration, pitch and yaw control are maintained by vectoring the nozzle 110 and/or empennage 150 control deflections. Roll control is obtained (exclusively in some embodiments) by empennage deflections in one preferred embodiment although thrust may also used for roll control with asymmetric internal thrust vane deflections.

Figure 8:
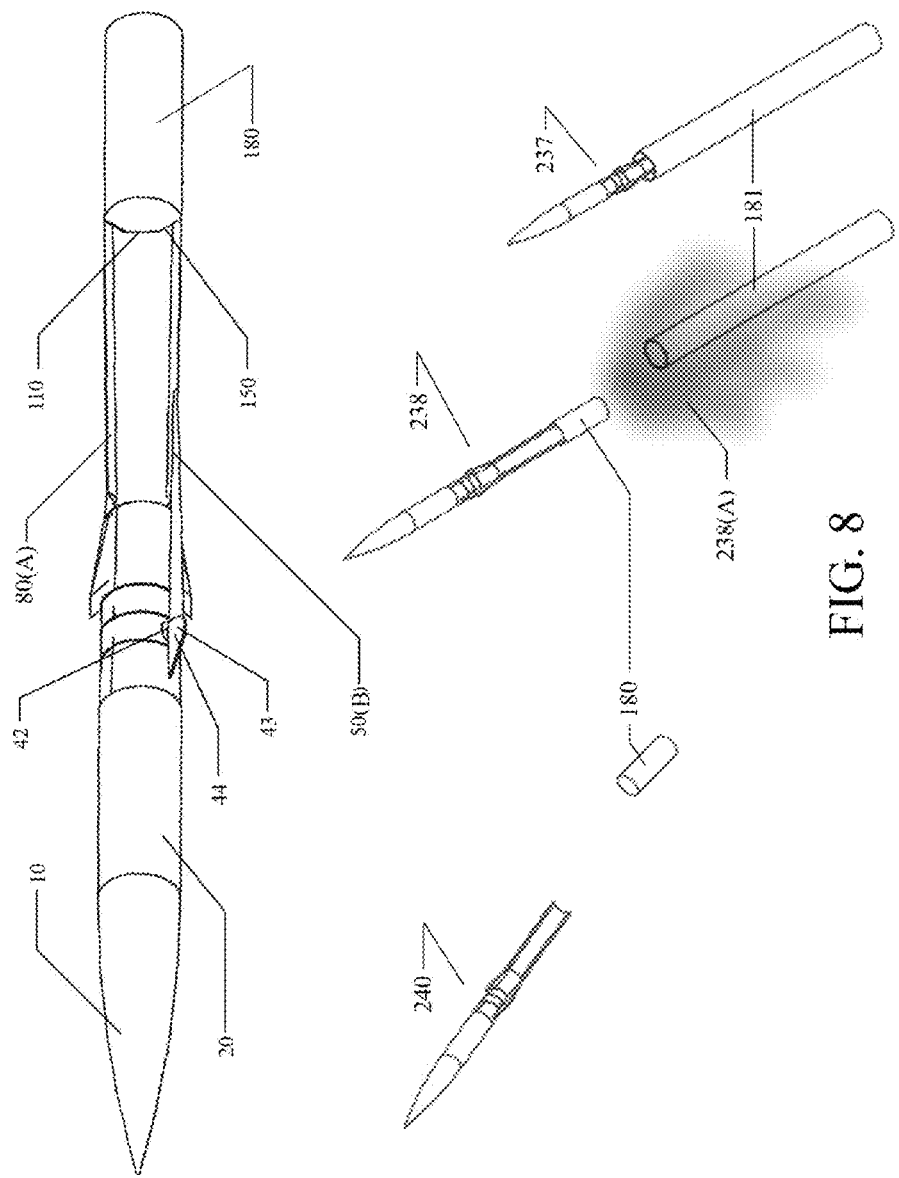
FIG. 8 shows the folding kinematics for the vehicle of FIG. 3 of the present. invention

FIG. 8 shows the rocket launch configuration of some embodiments of the present invention. Although a preferred method of launching and recovery in some embodiments is via vertical takeoff and landing (VTOL) flight configuration as shown in FIG. 4, another method of launch is via a rocket ejector charge and tube. The ejector charge 180 may take the form of a slower burning rocket motor of any configuration (liquid, solid, hybrid, hypergolic etc.) and eject some embodiments of the present invention. In that case, the ejector tube 181 would be a generic launch tube of any suitable cross-section and appropriate length. Such a tube may be mounted to a land surface vehicle, aircraft, surface naval vessel or subsea vessel.

The ejector charge 180 may also be a fast burning cartridge like those used to expel artillery shells from gun barrels. In that case, the ejector tube 181 would be a gun barrel. Such a gun barrel may be mounted on a land surface vessel, aircraft, or surface naval vessel.

Figure 9:
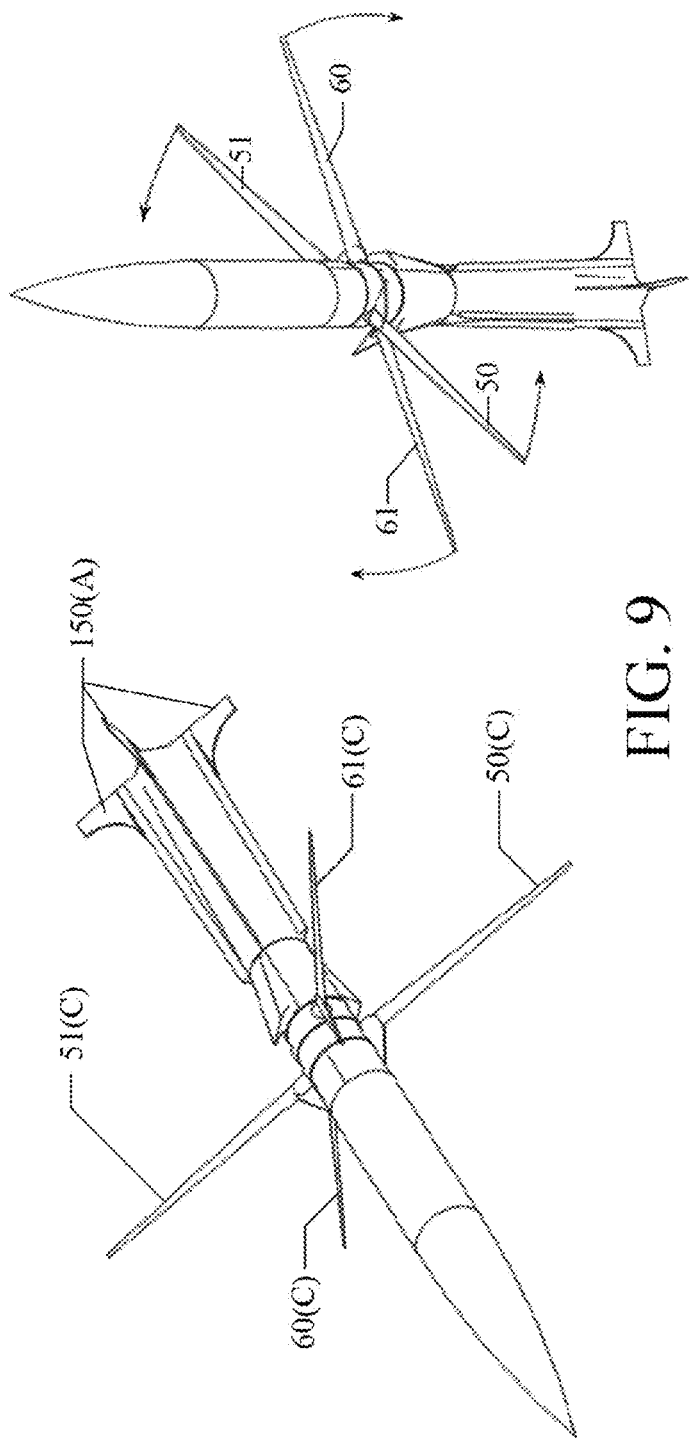
FIG. 9 shows an "X-Rotor" or "Stopped Rotor" of another embodiment of the present invention for high subsonic flight speed and hovering configurations of the four-bladed, two rotor variant of some embodiments of the present invention.

Although some embodiments of the present invention may possess a pair of single-bladed, counterbalanced rotors, another embodiment for higher maneuver performance (also higher drag), is the "X" configuration as shown in FIG. 9. This X configuration would use two pairs of counterrotating two-bladed rotors in both the hover configuration 50, 51, 60, 61 and the converted fixed-wing forward flight configuration above RTFCFS, 50(C), 51(C), 60(C), 61(C). The X-configuration of some embodiments of the present invention may also include an empennage configuration of any geometry. A suitable empennage geometry may include planar surfaces 150(A) or may be of doubled, enclosed, grid-fin or lattice fin geometries. Such an empennage would be capable of augmenting the thrust vectoring assembly, 110 in manipulating pitch, roll and yaw moments in all flight modes.

(1) In one embodiment, there is a convertible aircraft capable of sustained, extended hover and supersonic flight times comprising: a forward fuselage bay and assembly housing suitable sensor, guidance, navigation, control electronics, mission package(s) and fuel; a central rotor/wing bay and assembly housing rotors of any numbers of blades which have suitable cross-sections corresponding to design Mach numbers and are capable of feathering through +/−100°, flapping through ±45° and lagging to more than 90° so that they are capable of folding against the sides of the fuselage in high speed flight; a series of mechanisms to allow the rotors to execute the rotations prescribed by the flight control system; a lower fuselage bay which includes suitable fuel storage volume, at least one powerplant which is capable of delivering shaft power to the rotor assembly for hovering-mode flight; a mechanism which allows for the generation of jet-mode thrust in forward flight; an empennage assembly which includes full two-axis thrust vectoring along with aerodynamic flight control surfaces; an undercarriage assembly which includes a multitude of landing appendages which may be unfolded for shock-absorption on landing and accommodation of uneven surfaces; and an undercarriage assembly which has appendages on the ends which allow for ground operations. The aircraft can also include any number and configuration of either fixed or rotating canard, wing and/or empennage surfaces at any location on the body.

In another embodiment, the convertible aircraft described in paragraph (1) with a guidance, navigation and control system which is capable of commanding flight control devices, shaft engine power and jet engine thrust.

In yet other embodiments, the convertible aircraft described in paragraph (1) wherein there exists at least one engine producing shaft power and series of mechanisms which are capable of rotating a pair of single or multi-bladed rotors at high speeds in opposing directions.

In still other embodiments, the convertible aircraft described in paragraph (1) wherein there exists at least one engine which is capable of generating thrust by producing a jet of accelerated exhaust gasses which are expelled via a thrust-vectoring nozzle at the end of the aircraft.

In another embodiment, the convertible aircraft described in paragraph (1) wherein there exists a pair of rotors, which are designed to rotate about the primary longitudinal axis of the aircraft, or the "body X-axis" and are composed of any number of blades which can be actively manipulated by a mechanical means to feather, flap and lag so that the rotors support the aircraft as a rotorcraft in vertical flight modes, primarily generating thrust normal to the tip-path plane of the rotor itself.

In yet other embodiments, the convertible aircraft described in paragraph (1) wherein a plurality of hydraulic, pneumatic, mechanical, electro-mechanical devices are capable of manipulating rotor blade feathering angles with a period of at least one cycle per rotor revolution so that full longitudinal cyclic, lateral cyclic and collective flight control may be achieved.

In still other embodiments, the convertible aircraft described in paragraph (1) wherein there exists a pair of rotors, which are designed to rotate about the body X-axis and are composed of any number of blades which can be actively manipulated by a mechanical means to feather, flap and lag so that the rotors support the aircraft as a high angle of attack propeller-driven aircraft during transitional flight with a portion of the lift generated normal to the rotor tip-path plane and a portion of the lift generated in the plane of the rotor.

In another embodiment, the convertible aircraft described in paragraph (1) wherein there exists a pair of rotors, which are designed to rotate about the body X-axis and are composed of any number of blades which can be actively manipulated by a mechanical means to feather, flap and lag so that the rotors support the aircraft as a high speed transitioned propeller with the majority of the lift being generated in the tip-path plane of the rotor.

In yet other embodiments, the convertible aircraft described in paragraph (1) wherein there exists a pair of rotors, which are designed to rotate about the body X-axis and are composed of any number of blades which can be actively manipulated by a mechanical means to feather, flap and lag so that the rotors may be stopped in rotation about the body X-axis and locked so that they form at least one pair of wings with chord lines primarily lying in the direction of the body X axis, span lines, primarily along the body transverse axis, or the "body Y-axis" with suitable symmetric incidence angles superimposed to sustain lift with minimum cross-flow drag.

In still other embodiments, the convertible aircraft described in paragraph (1) wherein there exists a pair of rotors, which are designed to rotate about the body X-axis and are composed of any number of blades which can be actively manipulated by a mechanical means to feather, flap and lag so that the rotors may be stopped in rotation about the body X-axis and locked so that they form at least one pair of wings with chord lines primarily lying in the direction of the body X-Y plane, span lines swept behind along the body Y-axis with suitable symmetric incidence angles superimposed to sustain lift with minimum cross-flow drag.

In another embodiment, the convertible aircraft described in paragraph (1) wherein there exists a pair of rotors, which are designed to rotate about the body X-axis and are composed of any number of blades which can be actively manipulated by a mechanical means to feather, flap and lag so that the rotors may be stopped in rotation about the body X-axis and locked so that they form at least one pair of wings with chord lines primarily lying in the direction of the body Y axis, span lines, primarily along the body X-axis.

In yet other embodiments, the convertible aircraft described in paragraph (1) wherein the aircraft possesses a number of bays for housing avionics equipment, vehicle control systems and sensors, payload sensors, a mission package, communications equipment and fuel.

In still other embodiments, the convertible aircraft described in paragraph (1) wherein the aircraft possesses a plurality of empennage surfaces for maintenance of stability and control.

In yet other embodiments, the convertible aircraft described in paragraph (1) wherein the aircraft possesses a mechanical assembly for manipulating the direction of the exhaust of the jet engine.

In still other embodiments, the convertible aircraft described in paragraph (1) wherein the aircraft possesses a mechanical undercarriage assembly composed of a plurality of legs, at least one hinge and cross-brace members which allow for vertical take-off and landing.

In another embodiment, the convertible aircraft described in paragraph (1) wherein engine inlets are designed into an engine bay with lips and ducts which are suitably shaped and sized so as to minimize total pressure losses for design flight speeds.

In yet other embodiments, the convertible aircraft described in paragraph (1) wherein a plurality of refueling ports, defueling ports, fuel tubing, regulators, fuel bays, inserts and bladders are designed with fuel pumping and conditioning systems so that uncavitated, high quality fuel flow is supplied to both the shaft power engine and jet engine when commanded.

In still other embodiments, the convertible aircraft described in paragraph (1) wherein the external appendages can be stowed such that tube storage and launch can be achieved.

In still further embodiments, the convertible aircraft described in paragraph (1) wherein the fuselage shaping is such that the aircraft is capable of both an efficient hover and efficient high speed flight, through supersonic flight speeds.

While illustrated examples, representative embodiments and specific forms of the invention have been illustrated and described in detail in the drawings and foregoing description, the same is to be considered as illustrative and not restrictive or limiting. The description of particular features in one embodiment does not imply that those particular features are necessarily limited to that one embodiment. Features of one embodiment may be used in combination with features of other embodiments as would be understood by one of ordinary skill in the art, whether or not explicitly described as such. Exemplary embodiments have been shown and described, and all changes and modifications that come within the spirit of the invention are desired to be protected.

What is claimed is:

1. An aircraft, comprising:
   a fuselage including a forward portion, a central portion, and an aft portion, the fuselage defining a longitudinal axis extending through the forward portion, the central portion, and the aft portion;
   an engine mounted to the fuselage; and
   first and second wings rotatably mounted to the central portion of the fuselage,
   wherein the axis around which the wings rotate substantially coincides with the longitudinal axis,
   wherein the first and second wings are mechanically driven by the engine to counterrotate in rotational planes and create lift during flight,
   wherein the first and second wings are positioned to provide lift to support at least a portion of the aircraft's weight during horizontal flight while the first and second wings are not rotating;
   wherein the tip of the first wing sweeps in a plane generally defined by the tip of the first wing and the longitudinal axis, and the tip of the second wing sweeps in a plane generally defined by the tip of the second wing and the longitudinal axis, and
   wherein the tip of each of the first and second wings is swept to a location adjacent the fuselage during horizontal flight.

2. The aircraft of claim 1, wherein the engine can engage with and disengage from the two wings during flight.

3. The aircraft of claim 1, wherein the rotational planes are parallel and the two wings sweep in directions that are perpendicular to the parallel rotational planes.

4. The aircraft of claim 1, wherein the two wings rotate through more than three hundred sixty degrees)(360°) during flight.

5. The aircraft of claim 1, wherein the aircraft travels at a supersonic speed while the two wings are not rotating.

6. The aircraft of claim 4, wherein the aircraft hovers while the two wings are rotating.

7. The aircraft of claim 1, wherein the two wings sweep away from the flight direction.

8. The aircraft of claim 1, wherein the two wings sweep into the flight direction.

9. The aircraft of claim 1, wherein the two wings stop rotating during flight.

10. The aircraft of claim 1, wherein under normal flight operations each of the two wings are capable of repeated feathering of +/−100 degrees, repeated flapping of +/−45 degrees, and repeated lagging up to 90 degrees during flight.

11. The aircraft of claim 1, wherein the two wings move air in a generally nose to tail direction while counterrotating and creating lift during flight, and wherein the aircraft travels through the air with the air moving in a generally nose to tail direction during flight while the two wings are not rotating.

12. The aircraft of claim 1, wherein the external surface of the forward portion is a three-caliber ogive shape and the external surface of the central portion is a Sears-Haack shape.

13. The aircraft of claim 1, comprising:
 a plurality of legs, each leg having a forward portion and an aft portion, the forward portion of each leg being pivotally attached to the fuselage, wherein the aft portion of the leg moves outward from the fuselage in a radial direction to the longitudinal axis when the leg is deployed to support the aircraft on a support surface.

14. The aircraft of claim 13, wherein at least a portion of each of the plurality of legs is external to the fuselage during flight, and
 wherein the pivotal attachment between the forward portion of each leg and the fuselage moves parallel to the longitudinal axis when the aft portion of each leg moves inward or outward from the fuselage.

\* \* \* \* \*

UNITED STATES PATENT AND TRADEMARK OFFICE
CERTIFICATE OF CORRECTION

| | | |
|---|---|---|
| PATENT NO. | : 9,004,393 B2 | Page 1 of 1 |
| APPLICATION NO. | : 13/279827 | |
| DATED | : April 14, 2015 | |
| INVENTOR(S) | : Ronald M. Barrett-Gonzales | |

It is certified that error appears in the above-identified patent and that said Letters Patent is hereby corrected as shown below:

Claims

In Claim 1 (column 18, line 39), "during flight" should be changed to --during hovering flight--.

Signed and Sealed this
Fifteenth Day of December, 2015

Michelle K. Lee
*Director of the United States Patent and Trademark Office*